United States Patent
Yu et al.

(10) Patent No.: US 8,496,987 B2
(45) Date of Patent: Jul. 30, 2013

(54) TRANS FAT FREE PLASTIC COMPOSITION FOR BAKERY PRODUCTS

(75) Inventors: Weizhu Yu, Morris Plains, NJ (US); Richard B. Jackson, New York, NY (US)

(73) Assignee: Caravan Ingredients Inc., Lenexa, KS (US)

(*) Notice: Subject to any disclaimer, the term of this patent is extended or adjusted under 35 U.S.C. 154(b) by 1821 days.

(21) Appl. No.: 11/279,722

(22) Filed: Apr. 13, 2006

(65) Prior Publication Data

US 2007/0243308 A1  Oct. 18, 2007

(51) Int. Cl.
*A23D 7/005* (2006.01)

(52) U.S. Cl.
USPC .................................. 426/613; 426/601

(58) Field of Classification Search
USPC ............................................. 426/613
See application file for complete search history.

(56) References Cited

U.S. PATENT DOCUMENTS

| | | | |
|---|---|---|---|
| 3,595,674 A | | 7/1971 | Shaffer et al. |
| 4,861,612 A | * | 8/1989 | Nakano et al. ................ 426/607 |
| 5,879,735 A | * | 3/1999 | Cain et al. ..................... 426/603 |
| 5,908,655 A | | 6/1999 | Doucet |
| 5,912,042 A | * | 6/1999 | Cain et al. ..................... 426/607 |
| 6,596,337 B1 | * | 7/2003 | Vaslin et al. .................. 426/589 |
| 6,863,908 B2 | * | 3/2005 | Hamm et al. ................... 426/47 |
| 7,105,195 B2 | * | 9/2006 | Plank et al. ................... 426/601 |
| 7,547,459 B2 | * | 6/2009 | Plank et al. ................... 426/601 |
| 2006/0019021 A1 | * | 1/2006 | Plank et al. ................... 426/601 |

OTHER PUBLICATIONS

Rombauer, I. S. et al. 1997. Joy of Cooking. Penguin Group, New York. p. 338-342.*
Epstein, B. et al. 1986. Substituting Ingredients, 3$^{rd}$ edition. The Globe Pequot Press, Guilford, CT. p. 10.*

* cited by examiner

*Primary Examiner* — Carolyn Paden
(74) *Attorney, Agent, or Firm* — Hovey Williams LLP

(57) ABSTRACT

A stable trans fat free emulsifier composition is provided that may have other functional ingredients incorporated to form a base for a flour-based dough preparation to hold the ingredients together. A glyceride emulsifier is heated above its melting point and blended with a non-hydrogenated vegetable oil, or a quantity of glyceride emulsifier is blended with non-hydrogenated vegetable oil and the mixture then heated to a temperature above its melting point. The ratio of emulsifier to vegetable oil is selected to cause the composition, upon cooling, to form a solid plastic mass. The hardness value of the plastic mass is within a range especially applicable to bakery dough applications.

23 Claims, 1 Drawing Sheet

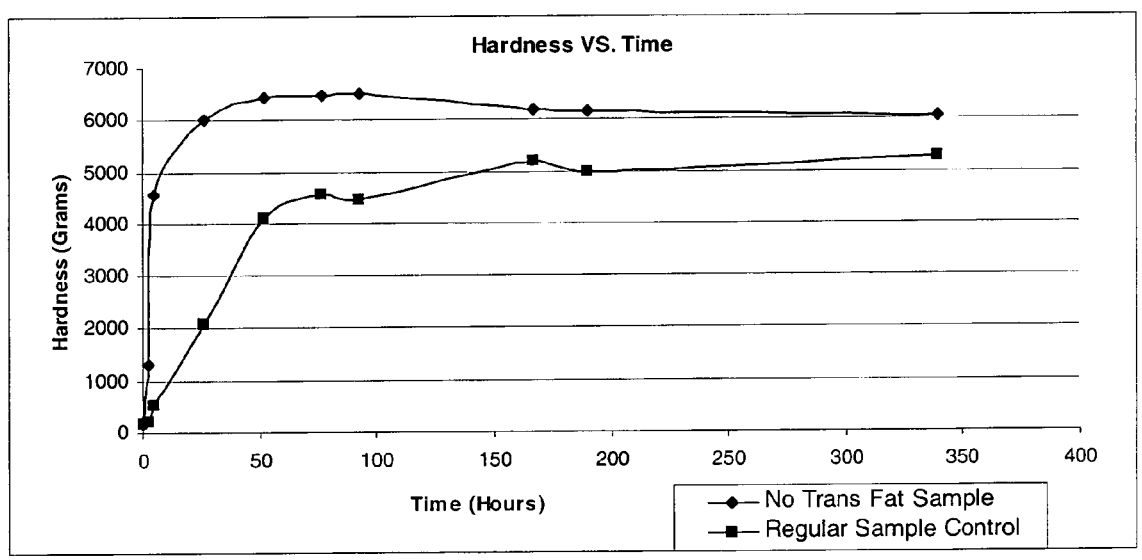

TRANS FAT FREE PLASTIC COMPOSITION FOR BAKERY PRODUCTS

BACKGROUND OF THE INVENTION

1. Field of the Invention

This invention relates to a stable trans fat free plastic paste emulsifier composition to be used as the continuous phase of a base used in dough preparation. The emulsifier composition is functional to hold the ingredients of a base together.

A quantity of a mono- and diglyceride emulsifier is blended with non-hydrogenated vegetable oil and then heated to the melting point of the blend. Alternatively, the emulsifier is heated above its melting point and blended with non-hydrogenated vegetable oil at a similar temperature. The ratio of emulsifier to vegetable oil is selected to cause the composition, upon cooling, to form a solid and stable plastic mass. The hardness value of the base is within a range that is especially applicable to bakery dough preparation applications. Oiling of the vegetable oil is avoided even at the high temperatures encountered during warm summer seasons or during storage of the composition.

A variety of ingredients and agents may be incorporated in the plastic mass to provide a full range base having properties and characteristics allowing commercial bakeries to simply add the base to bakery dough without the need to add other functional constituents.

2. Description of the Prior Art

Plastic products conventionally used as a base for the dough of flour-based food products contain a shortening that usually is in the form of an initially liquid fat that has been hydrogenated to form a semi-solid mass. A typical plastic base that has been long supplied to baking ingredient suppliers contains about 25% salt, 35% sugar and/or dextrose, 30% shortening, and 10% other ingredients, which may include oxidation-reducing agents, emulsifiers, enzymes, etc. Currently, the baking industry primarily uses shortening produced from partially hydrogenated vegetable oil to make plastic bases. The shortening in the plastic base serves as the fat source for the baked goods, contributing to desirable texture and flavor of the finished products. After melting of the partially hydrogenated semi-solid vegetable oil, the melted shortening is mixed with solid ingredients, sometimes votated, and then deposited in a plastic bag in a box. The hydrogenated fat solidifies as the product cools down and eventually becomes a one-piece solid chunk having the shape of the box. Bakers use this plastic product as a base and simply add flour, water, and yeast to prepare dough, instead of adding many different ingredients. These partially hydrogenated shortenings generally have a melting point higher than 100° F. and serve as the continuous phase to hold the ingredients of the base together until added to dough.

Partially hydrogenated shortenings include trans fats. Recently, studies have established that there is a negative health impact from the use of shortenings that contain trans fats generated during the hydrogenation process of liquid fats. Plant oils having a high saturated fat content, such as palm oil, have also been implicated in adverse health effects and, therefore, are less desirable than vegetable oils having a lower amount of saturated fat, for preparing the emulsifier composition of this invention.

SUMMARY OF THE INVENTION

This invention combines a glyceride emulsifier with a non-hydrogenated vegetable oil to form a plastic/paste replacement composition for partially hydrogenated shortenings. Without the addition of an emulsifier, non-hydrogenated vegetable oil would not be useful as a plastic/paste shortening substitute. "Plastic" and "plastic/paste" as used herein mean that the formulation is pliable, gives way when force is applied, is malleable yet self-sustaining at room temperature, and there is no tendency for the vegetable oil to leak out of the composition or form an oily phase, as would occur if the constituents were simply mixed one with the other. The plastic emulsifier composition made in accordance with the improved process of this invention has physical and functional characteristics that are fully equivalent to current partially hydrogenated shortenings, but without an attendant trans fat fraction. Furthermore, the composition has a lower saturated fat content than a no trans fat product made from, for example, palm oil.

A variety of additives may be incorporated in the improved emulsifier composition to form plastic products (bases), permitting a bakery to prepare baked goods by simply adding the base to flour, water, and yeast. A wide variety of bases may be formulated with the basic combination of a glyceride emulsifier and a non-hydrogenated vegetable oil.

A mono- and diglyceride emulsifier is blended with a non-hydrogenated vegetable oil and then heated to or above its melting point and the liquefied substance is then blended with non-hydrogenated vegetable oil with similar temperature. The glyceride emulsifier is preferably melted at a temperature above its melting point within a range of from about 105° F. to about 180° F., more preferably from about 145° F. to about 170° F., and most preferably about 160° F. The ratio of emulsifier and vegetable oil is sufficient to cause the composition upon cooling to form a solid plastic mass having required pliability and plasticity for use as an dough additive (base) in commercial baking operations.

DESCRIPTION OF THE DRAWING

FIG. 1 is a graph plotting hardness of a sample containing no trans fat and of a regular control sample containing trans fat.

DETAILED DESCRIPTION OF THE PREFERRED EMBODIMENT

Commercially available diglyceride emulsifiers typically contain about 40% to 55% monoglycerides, 38% to 45% diglycerides, 8% to 12% triglycerides, and 1% to 7% free glycerol. One preferred diglyceride emulsifier for use in the present invention has an increased level of diglycerides, for example, greater than 60% to about 80%, more preferably about 70% to 80%, and most preferably about 74% on a w/w basis. When a high diglyceride emulsifier is selected for use in the present invention, the high diglyceride emulsifier should be melted at a temperature of about 120° F. to about 180° F., with the preferred melting temperature being about 160° F.

The high diglyceride emulsifier blended with a non-hydrogenated vegetable oil and then heated sufficiently to melt the emulsifier, or heated to a temperature above its melting point and the liquefied substance is then blended with non-hydrogenated vegetable oil at a similar temperature. Any one of a number of vegetable oils are useful in preparing the emulsifier composition of this invention. Exemplary vegetable oils include, but are not limited to, canola oil, coconut oil, corn oil, cottonseed oil, flaxseed oil, peanut oil, safflower oil, sesame oil, soybean oil, and sunflower oil. Refined, bleached, and deodorized (RBD) soybean oil is preferred because it is readily available at an attractive price compared with the other vegetable oils.

Blending of the diglyceride emulsifier with the vegetable oil can be carried out in conventional jacketed temperature-controlled mixing equipment. After thorough melting and blending of the emulsifier composition, it is allowed to cool, or the temperature lowered by passing of a coolant agent through the jacketed mixer or in a separate conventional chiller. The relative ratio of emulsifier and vegetable oil is selected to cause the composition upon cooling to form a solid plastic mass. The glyceride emulsifier in the blended composition is preferably from about 5% to about 40% w/w of the mass, more preferably from about 8% to about 30% w/w of the mass, and most preferably from about 10% to about 25% w/w of the mass. A preferred final emulsifier composition contains about 20% of the high diglyceride emulsifier and about 80% of soybean oil, or other equivalent vegetable oil.

The high diglyceride emulsifier comprises:

TABLE 1

| |
|---|
| Fatty acids $C_{12}$-$C_{22}$, preferably >80% $C_{16}$-$C_{18}$ |
| Monoglycerides <30%; preferably <20%; most preferably about 10% or less |
| Diglycerides >60%; preferably >65%; most preferably about 70% or higher |
| Triglycerides being the remainder |

The most preferred high diglyceride emulsifier contains from about 70% to about 75% diglycerides; about 10% monoglycerides, and the remainder triglycerides.

The high diglyceride emulsifier as set forth in Table 1 is produced by interesterification of C12-C22 and preferably C16-C18 fat in the presence of glycerin and a catalyst such as calcium or sodium hydroxide. After the interesterification reaction, the catalyst is inactivated by addition of phosphoric acid and the excess glycerin is removed by distillation under vacuum. The interesterification reaction may also be carried out in the presence of an appropriate enzyme as the catalyst. The glycerin to fat ratio is regulated to give a mono- and diglyceride composition that falls within the parameters of Table I.

Alternately, the selected fat may be interesterified in the presence of glycerin and a catalyst such as calcium or sodium hydroxide. After the interesterification reaction the catalyst is inactivated by addition of phosphoric acid and the excess glycerin is removed by an appropriate procedure such as distillation under vacuum. As a further alternative, a selected fatty acid may be esterified in the presence of glycerin and a catalyst such as calcium or sodium hydroxide. After the esterification reaction the catalyst is inactivated by addition of phosphoric acid and the excess glycerin is removed by an appropriate procedure such as distillation under vacuum. The interesterification or esterification reaction may also be carried out in the presence of an appropriate enzyme as the catalyst. The glycerin to fat ratio is picked to give a maximal level of monoglycerides. The resulting mono and diglyceride portion is subjected to distillation under vacuum to separate most of the monoglyceride component from the diglyceride component, to again provide a composition that is within the parameters of Table I.

The quantity of glyceride emulsifier and the amount of non-hydrogenated vegetable oil are correlated to produce a plastic mass base that has a hardness of from about 1,000 to about 20,000 gms, preferably from about 2,500 to about 10,000 gms, and most preferably from about 3,500 to about 7,500 gms when measured using a TXT 2 Texture Analyzer. The plastic product needs to be harder than 1,000 gms using the TXT 2 Texture Analyzer set up and operated as described.

TABLE 2

Measurement of Time Required for Plastic Product to Set Before Ready or Shipping

| Time (Hours) | No Trans Fat Sample | Regular Sample Control |
|---|---|---|
| 0 | 189 | 172 |
| 2 | 1299 | 197 |
| 5 | 4561 | 524 |
| 26 | 6020 | 2071 |
| 52 | 6419 | 4101 |
| 77 | 6482 | 4553 |
| 93 | 6499 | 4467 |
| 167 | 6184 | 5190 |
| 190 | 6168 | 4991 |
| 339 | 6032 | 5266 |

FIG. 1 in the drawing is a graph plotting hardness versus time of a composition prepared in accordance with the preferred process of this invention that is devoid of trans fat, as compared with a regular sample containing a quantity of trans fat, showing that the hardness of a composition without trans fat is accomplished in a shorter period of time with a higher hardness level than a sample treated under the same conditions that contains trans fat.

Table 2 and the graph of FIG. 1 record hardness measurements as a function of elapsed time of preparation of the plastic emulsifier composition from a high diglyceride emulsifier and RBD soybean oil, as compared with a conventional hydrogenated soybean oil shortening, measured with the TXT 2 Texture Analyzer having a ¾ inch diameter ball probe and with the Text condition being 10 mm of penetration. The plastic product needs to have a hardness greater than 1,000 gms as measured with the TXT 2 Texture Analyzer to be ready for shipping. A plastic base made with conventional hydrogenated vegetable oil shortening, made for example from soybean oil, requires overnight storage to reach a hardness necessary for shipping. The plastic base product made with the improved glyceride and vegetable emulsifier of this invention can be shipped the same production day, in that the desired 1,000 gms hardness level is achieved in less than 2 hours, whereas with the conventional product, such level is not reached until at least about 24 hours.

The range of ingredients in a plastic base with emulsifier composition in accordance with this invention is shown in Table 3.

TABLE 3

Range of Ingredients in Plastic Base Products for Bread and Cake

| | Range (%) |
|---|---|
| Salt | 0-60 |
| Sugar | 0-50 |
| Dextrose | 0-40 |
| Fat | 15-60 |
| Emulsifier | 0-10 |
| Enzyme | 0-5 |
| Oxidation agent | 0-2 |
| Reducing agent | 0-2 |

Other ingredients include soy flour, starch, wheat flour, gum, gluten, etc., depending on the desired formulation.

An example of a preferred formulation for the plastic emulsifier composition of this invention are set forth below, on a weight basis.

| Formula I | |
|---|---|
| INGREDIENT | PERCENTAGE |
| SOY BEAN OIL | 20 |
| HIGH DIGLYCERIDE | 5 |
| SOYBEAN FLOUR | 3 |
| CORN STARCH | 6 |
| SALT | 25 |
| SUGAR | 25 |
| DEXTROSE | 10 |
| L. CYSTEINE | 0.1 |
| POTASSIUM IODATE | 0.1 |
| ENZYMES | 0.02 |
| MONOGLYCERIDE | 4 |
| CALCIUM STEAROL LACTYLATE | 1.78 |
| TOTAL | 100 |

A preferred monoglyceride emulsifier containing about 90% of monoglycerides, with the remainder of the emulsifier being diglycerides and triglycerides, may also be used in preparing the emulsifier composition of this invention. The monoglyceride emulsifier should be blended with non-hydrogenated vegetable oil and then heated to melt the material, or it is heated above its melting point and blended with non-hydrogenated vegetable oil with similar temperature. The melting temperature of monoglyceride should be in the range from 105° F. to about 180° F., preferably from about 145° F. to about 170° F., and most preferably about 160° F. Other functional ingredients to form the desired base are added to the emulsifier composition, and then cooled to form a plastic base.

We claim:

1. A trans fat free plastic composition comprising:
    from about 5% to about 40% w/w of a high diglyceride emulsifier in which the diglyceride portion of the emulsifier is greater than about 65%;
    from about 60% to about 95% w/w of a non-hydrogenated vegetable oil; and
    an ingredient selected from the group consisting of sugar, dextrose, soy flour, wheat flour, gum, gluten, and mixtures thereof,
    said composition being in the form of a solid plastic mass, wherein said % w/w are based upon the total mass.

2. The composition as set forth in claim 1, wherein the emulsifier has been melted prior to blending with the vegetable oil, or blended with vegetable oil and then heated to its melting point.

3. The composition as set forth in claim 1, wherein the emulsifier has a melting point of from about 120° F. to about 180° F.

4. The composition as set forth in claim 1, wherein the emulsifier has a melting point of about 160° F.

5. The composition as set forth in claim 1, wherein the emulsifier is from about 8% to about 30% w/w of the mass.

6. The composition as set forth in claim 1, wherein the emulsifier is from about 10% to about 25% w/w of the mass.

7. The composition as set forth in claim 1, wherein the mass on a w/w basis includes about 20% of emulsifier and about 80% of vegetable oil.

8. The composition as set forth in claim 1, wherein said vegetable oil is selected from the group consisting of canola oil, coconut oil, corn oil, cottonseed oil, flaxseed oil, peanut oil, safflower oil, sesame oil, soybean oil, and sunflower oil.

9. The composition as set forth in claim 1, wherein said vegetable oil is soybean oil.

10. The composition as set forth in claim 1, wherein the emulsifier includes from about 70% to about 80% w/w of diglycerides.

11. The composition as set forth in claim 1, wherein the emulsifier includes about 74% w/w of diglycerides.

12. The composition as set forth in claim 1, wherein the emulsifier is prepared by interesterification of $C_{12}$-$C_{22}$ fatty acid and glycerol.

13. The composition as set forth in claim 1, wherein the emulsifier is prepared by interesterification of $C_{16}$-$C_{18}$ fatty acid and glycerol.

14. The composition as set forth in claim 1, wherein the emulsifier comprises a mixture of about 11% monoglycerides, 74% diglycerides, and 15% triglycerides w/w.

15. A method of preparing a trans fat free plastic composition for flour-based baked food products, said method comprising the steps of:
    forming a melted blend by:
        heating from about 5% to about 40% w/w of a high diglyceride emulsifier in which the diglyceride portion of the emulsifier is greater than about 65% to a temperature above the melting point of the emulsifier; blending the heated emulsifier with from about 60% to about 95% w/w of a non-hydrogenated vegetable oil with similar temperature; and adding an ingredient selected from the group consisting of sugar, dextrose, soy flour, wheat flour, gum, gluten, and mixtures thereof; or
        blending from about 5% to about 40% w/w of a high glyceride emulsifier in which the diglyceride portion of the emulsifier is greater than about 65% with from about 60% to about 95% w/w of a non-hydrogenated vegetable oil; heating the mixture of the emulsifier and vegetable oil to a temperature above its melting point; and adding an ingredient selected from the group consisting of sugar, dextrose, soy flour, wheat flour, gum, gluten, and mixtures thereof; and
    cooling the melted blend of the emulsifier, vegetable oil, and ingredient, to form a solid plastic mass, wherein said % w/w are based upon the total mass.

16. A method as set forth in claim 15, wherein is included the step of heating the emulsifier to a temperature of from about 120° F. to about 180° F.

17. A method as set forth in claim 15, wherein is included the step of heating the emulsifier to a temperature of about 160° F.

18. A method as set forth in claim 15, wherein is included the step of combining on a w/w basis from about 8% to about 30% of the emulsifier with the vegetable oil in the mass.

19. A method as set forth in claim 15, wherein is included the step of combining on a w/w basis from about 10% to about 25% of the emulsifier with the vegetable oil in the mass.

20. A method as set forth in claim 15, wherein is included the step of combining the vegetable oil with an emulsifier having from about 70% to about 80% w/w of diglycerides.

21. A method as set forth in claim 15, wherein is included the step of combining the vegetable oil with an emulsifier having about 74% w/w of diglycerides.

22. A method as set forth in claim 15, wherein said vegetable oil is selected from the group consisting of canola oil, coconut oil, corn oil, cottonseed oil, flaxseed oil, peanut oil, safflower oil, sesame oil, soybean oil, and sunflower oil.

23. A trans fat free emulsifier composition that may have other functional ingredients incorporated to form a base for a flour based dough preparation and to hold the ingredients together, said composition comprising on a w/w basis: about 20 parts of soybean oil, about 5 parts of a high diglyceride emulsifier in which the diglyceride portion of the emulsifier is greater than about 65%, about 3 parts of soybean flour, about 6 parts of cornstarch, about 25 parts of salt, about 25 parts of sugar, about 0.1 part of L-Cysteine, about 0.1 part of potassium iodate, about 0.02 part of an enzyme with protease and alpha amylase activity, about 4 parts of monoglyceride, about 1.8 parts of calcium stearoyl lactylate, and about 10 parts of dextrose, the emulsifier having been blended with the vegetable oil at a temperature above the melting point of the emulsifier, and the ratio of emulsifier and vegetable oil being sufficient to cause the base including any other added ingredients upon cooling to form a solid plastic mass.

\* \* \* \* \*